(12) United States Patent
Heaney et al.

(10) Patent No.: US 9,741,004 B1
(45) Date of Patent: Aug. 22, 2017

(54) APPARATUS AND METHOD FOR TRANSFORMING WEB SERVICES INTO MANAGED WORKFLOW ACTIONS

(75) Inventors: Stephen Robert Heaney, Tarneit (AU); Tahsin Murat Boduroglu, Melbourne (AU); Brian Geoffrey Cook, Victoria (AU)

(73) Assignee: NINTEX PTY LIMITED, Melbourne, Victoria (AU)

( * ) Notice: Subject to any disclaimer, the term of this patent is extended or adjusted under 35 U.S.C. 154(b) by 47 days.

(21) Appl. No.: 13/587,741

(22) Filed: Aug. 16, 2012

(51) Int. Cl.
*G06Q 10/06* (2012.01)

(52) U.S. Cl.
CPC .................. *G06Q 10/0633* (2013.01)

(58) Field of Classification Search
CPC ................................. G06Q 10/0633
See application file for complete search history.

(56) References Cited

U.S. PATENT DOCUMENTS

| | | | |
|---|---|---|---|
| 6,298,057 B1 * | 10/2001 | Guy et al. ................... 370/389 |
| 6,941,277 B2 * | 9/2005 | Imago ....................... 705/26.62 |
| 7,117,259 B1 * | 10/2006 | Rohwer ........................ 709/223 |
| 7,526,433 B2 * | 4/2009 | Yoshiaki et al. .............. 705/304 |
| 7,571,123 B1 * | 8/2009 | Hill ......................... G06Q 10/06 705/26.5 |
| 7,640,248 B2 * | 12/2009 | Nakamura |
| 8,671,090 B2 * | 3/2014 | Naick et al. .................. 707/709 |
| 2004/0199896 A1 * | 10/2004 | Goodman ................. G06F 8/34 717/100 |
| 2006/0190806 A1 * | 8/2006 | Sasson .................. G06F 9/4443 715/202 |
| 2007/0118634 A1 * | 5/2007 | Chan ......................... G06F 8/24 709/223 |
| 2008/0177822 A1 * | 7/2008 | Yoneda ........................ 709/202 |
| 2008/0288547 A1 * | 11/2008 | Brodsky ............. G06F 17/3089 |
| 2010/0064357 A1 * | 3/2010 | Baird ....................... G06F 8/30 726/6 |
| 2012/0215599 A1 * | 8/2012 | Hayward ..................... 705/14.4 |
| 2013/0125168 A1 * | 5/2013 | Agnihotri et al. ............. 725/38 |

* cited by examiner

Primary Examiner — Arvin Eskandarnia
(74) Attorney, Agent, or Firm — K&L Gates LLP

(57) ABSTRACT

A non-transitory computer readable storage medium includes executable instructions to supply a catalog of open domain workflow actions, receive a selected open domain workflow action and operate a service interface responsive to the execution of a defined workflow that includes the selected open domain workflow action. The service interface includes executable instructions to retrieve information from a web service and format the information for utilization in the defined workflow.

15 Claims, 7 Drawing Sheets

APPARATUS AND METHOD FOR TRANSFORMING WEB SERVICES INTO MANAGED WORKFLOW ACTIONS

FIELD OF THE INVENTION

This invention relates generally to data storage and retrieval in a networked environment. More particularly, this invention is directed to transforming a web service on the internet into a managed workflow action for use within a workflow automation system.

BACKGROUND OF THE INVENTION

A web service is a method of communication between two electronic devices in a networked environment, such as the internet. More particularly, a web service is a software system designed to support interoperable machine-to-machine interactions over a network. A web service has an interface described in a machine-processable format (e.g., Web Services Description Language or WSDL). Other systems interact with the web service in a manner prescribed by its description using Simple Object Access Protocol (SOAP) messages, typically conveyed using Hypertext Transport Protocol (HTTP) with an Extendable Markup Language (XML) serialization in conjunction with other Web-related standards.

Google® has a web service that provides weather information for a specified locale. The web service call http://www.google.com/ig/api?weather=seattle produces the following results.

```
<?xml version="1.0" ?>
- <xml_api_reply version="1">
- <weather module_id="0" tab_id="0" mobile_row="0"
    mobile_zipped="1" row="0" section="0">
- <forecast_information>
    <city data="Seattle, WA" />
    <postal_code data="seattle" />
    <latitude_e6 data="" />
    <longitude_e6 data="" />
    <forecast_date data="2012-06-20" />
    <current_date_time data="2012-06-20 19:53:00 +0000" />
    <unit_system data="US" />
  </forecast_information>
- <current_conditions>
    <condition data="Clear" />
    <temp_f data="68" />
    <temp_c data="20" />
    <humidity data="Humidity: 49%" />
    <icon data="/ig/images/weather/sunny.gif" />
    <wind_condition data="Wind: NW at 14 mph" />
  </current_conditions>
- <forecast_conditions>
    <day_of_week data="Wed" />
    <low data="54" />
    <high data="73" />
    <icon data="/ig/images/weather/mostly_sunny.gif" />
    <condition data="Mostly Sunny" />
  </forecast_conditions>
- <forecast_conditions>
    <day_of_week data="Thu" />
    <low data="55" />
    <high data="81" />
    <icon data="/ig/images/weather/mostly_sunny.gif" />
    <condition data="Mostly Sunny" />
  </forecast_conditions>
- <forecast_conditions>
    <day_of_week data="Fri" />
    <low data="54" />
    <high data="64" />
    <icon data="/ig/images/weather/chance_of_rain.gif" />
    <condition data="Chance of Showers" />
```

-continued

```
  </forecast_conditions>
- <forecast_conditions>
    <day_of_week data="Sat" />
    <low data="52" />
    <high data="61" />
    <icon data="/ig/images/weather/chance_of_rain.gif" />
    <condition data="Chance of Rain" />
  </forecast_conditions>
  </weather>
  </xml_api_reply>
```

The foregoing web service results have an ad hoc structure. The results include information, such as the forecast date, the current time, condition data, the temperature in Fahrenheit, the temperature in Centigrade, humidity data, wind condition data, a low temperature for the day, and the high temperature for the day. Similar data is provided for subsequent days of the week.

A user accessing this data may want a subset of the data and may want it formatted in a certain manner. Such customization is possible for a technically proficient individual, but is not practical for most computer users.

Tools have been developed that allow non-technical computer users to specify a workflow to accomplish a data processing task. A workflow is a computer controlled sequence of connected workflow actions. A workflow action is a computer controlled operation on one or more inputs to produce one or more outputs. Thus, a workflow action is a unit of work, such as connecting to a data source, performing a data transformation or initiating an interaction, such as granting approval or providing other forms of data.

A defined workflow is a user specified workflow. For example, a canvas may be used to graphically represent connected workflow actions forming a defined workflow.

The defined workflow may be operated in a closed domain of an enterprise. A closed domain is a private network. The private network may maintain privacy through controlled connections and/or through the use of an enterprise firewall. An open domain is a public network, such as the publicly accessible internet. An open domain has shared connections and observes various communication protocols.

Since an enterprise may operate in a closed domain, it is possible to control communication protocols and otherwise provide interoperability between components in the enterprise. A defined workflow may be formed with enterprise workflow actions. In such a case, the workflow is controlled by the enterprise to insure interoperability between workflow actions.

There are many resources outside a closed domain. That is, the open domain has a practically unlimited store of information. Much of this information is available through web services. Unfortunately, it is difficult to incorporate this open domain information into closed domain systems because of incompatible protocols and formats. As demonstrated with the exemplary method call above, information returned from a call to a web service may have an unruly format and may include information of no value to a user.

In view of the foregoing, it would be desirable to provide techniques to allow technically unsophisticated computer users to define workflows. More particularly, it would be desirable to provide tools to allow such users to create a defined workflow with enterprise workflow actions and open domain workflow actions. Ideally, enterprise style management and control features would be added to the open domain workflow actions so that they could be added to workflows in the same way as enterprise workflow actions.

SUMMARY OF THE INVENTION

A non-transitory computer readable storage medium includes executable instructions to supply a catalog of open domain workflow actions, receive a selected open domain workflow action and operate a service interface responsive to the execution of a defined workflow that includes the selected open domain workflow action. The service interface includes executable instructions to retrieve information from a web service and format the information for utilization in the defined workflow.

A non-transitory computer readable storage medium includes executable instructions to provide a workflow designer, receive a defined workflow including enterprise workflow actions and an open domain workflow action. The defined workflow is executed in a closed domain by processing the enterprise workflow actions natively and processing received formatted information in response to an open domain method call associated with the open domain workflow action.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
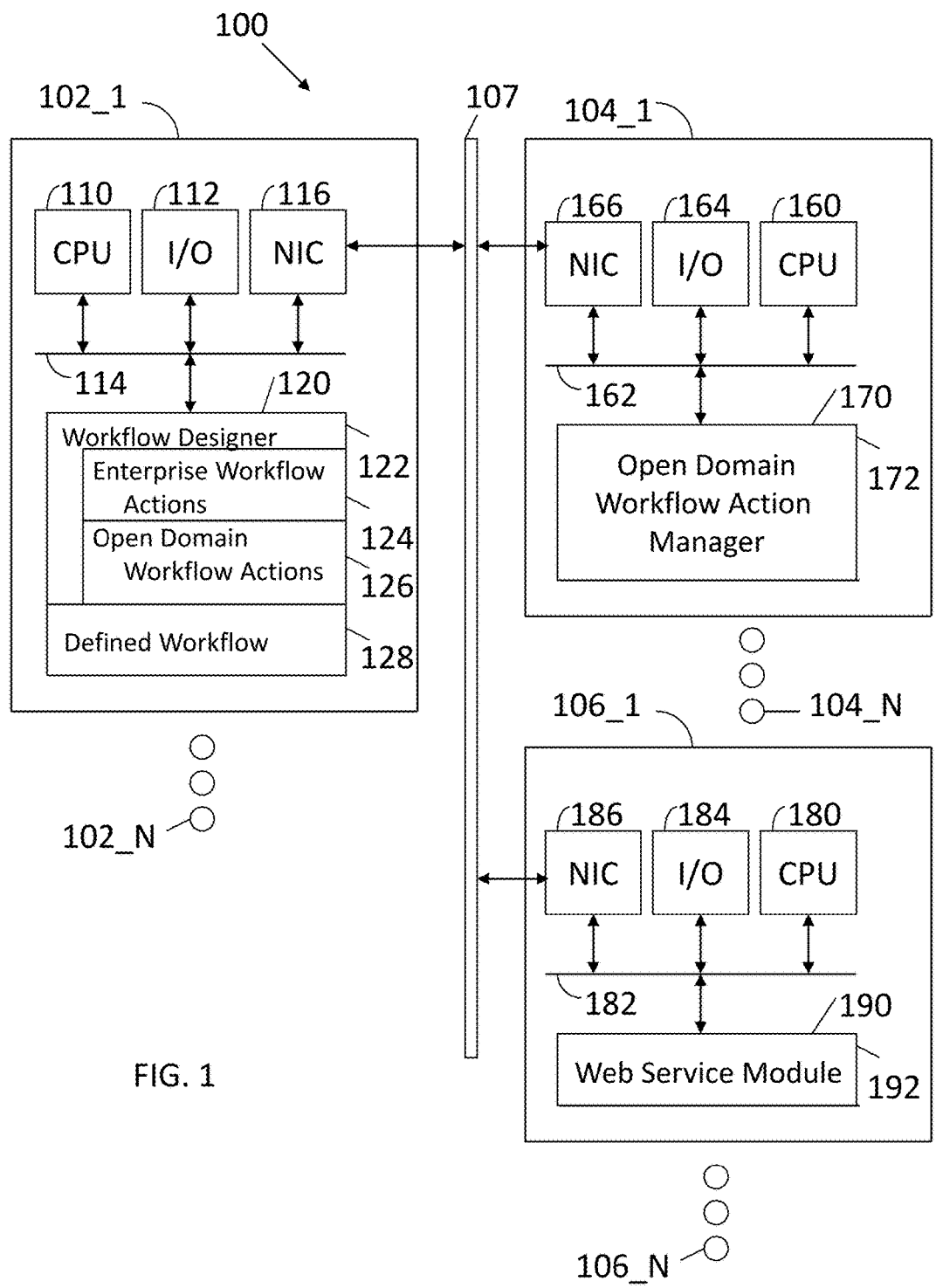
FIG. 1 illustrates a system configured in accordance with an embodiment of the invention.

FIG. 1 illustrates a system 100 configured in accordance with an embodiment of the invention. The system 100 includes a set of enterprise computers 102_1 through 102_N. The enterprise computers 102 operate in a closed domain, but are connected to external servers 104_1 through 104_N and 106_1 through 106_N via a network 107, which may be any wired or wireless network. Closed domain isolation for the enterprise computers 102 may be established through the use of a firewall (not shown). Consequently, the enterprise computers 102 may operate in both the closed domain and access the open domain.

Each enterprise computer 102 includes standard components, such as a central processing unit 110 and input/output devices 112 connected via a bus 114. The input/output devices 112 may include standard components, such as a keyboard, mouse, display, printer and the like. A network interface circuit 116 is also connected to the bus 114 to provide network connectivity. A memory 120 is also connected to the bus 114. The memory 120 stores executable instructions to implement operations of the invention. In one embodiment, the memory 120 stores a workflow designer 122. The workflow designer 122 includes executable instructions to produce a defined workflow 128. In one embodiment, the workflow designer 122 includes a set of enterprise workflow actions 124. The enterprise workflow actions 124 are workflow actions defined within the closed domain. The enterprise workflow actions execute natively within the closed domain.

The workflow designer 122 may also include open domain workflow actions 126. The open domain workflow actions are workflow actions that retrieve information from the open domain. The open domain workflow actions execute in the closed domain after processing performed in accordance with the invention. In particular, the processing includes accessing a web service through an open domain hosted resource with a service interface. The service interface includes executable instructions to retrieve information from a web service and format the information for utilization in the defined workflow.

One or more of the servers 104 may operate as the open domain hosted resource. Server 104_1 includes standard components, such as a central processing unit 160 and input/output devices 164 connected via a bus 162. A network interface circuit 166 is also connected to the bus 162. A memory 170 is also connected to the bus 162. The memory stores executable instructions implementing an open domain workflow action manager 172. The open domain workflow action manager 172 is responsive to an open domain workflow action call. In response to the call, the open domain workflow action manager retrieves information from a web service and formats the information for utilization in the defined workflow.

Servers 106 may host various web services. Server 106_1 includes standard components, such as a central processing unit 180 connected to input/output devices 184 via a bus 182. A network interface circuit 186 is also connected to bus 182. A memory 190 stores a web service module 192, which provides standard web service functionality.

The configuration of system 100 is exemplary. Alternate system configurations may be used in accordance with embodiments of the invention. For example, individual processing modules may be duplicated on various machines or distributed across various machines.

Figure 2:
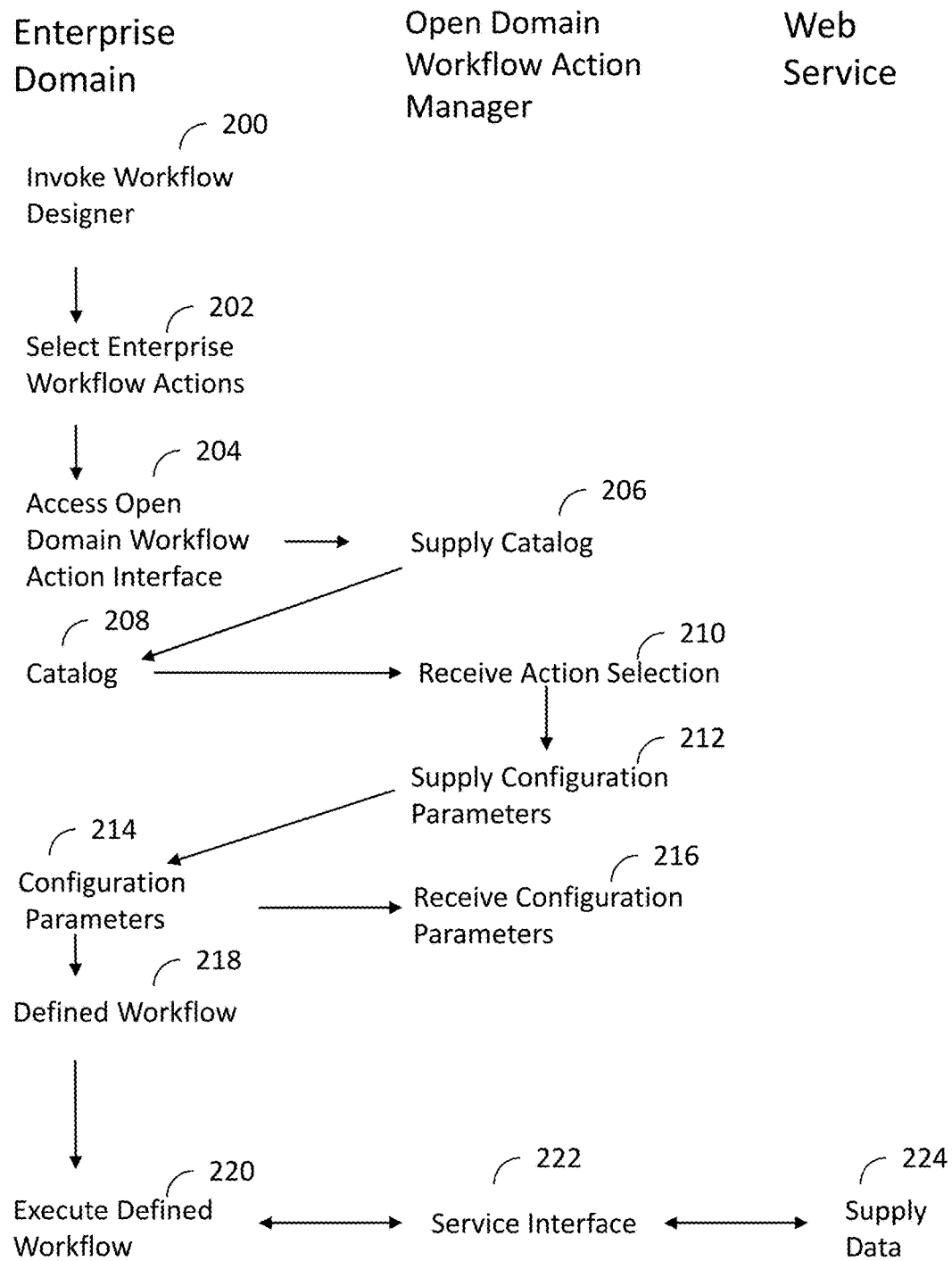
FIG. 2 illustrates processing operations associated with an embodiment of the invention.

FIG. 2 illustrates processing operations associated with an embodiment of the invention. FIG. 2 illustrates interactions between an enterprise domain, the open domain workflow action manager and a web service. Initially, the workflow designer 122 is invoked in the enterprise domain 200. A user may then construct a defined workflow by selecting enterprise workflow actions 202. A user may also access an open domain workflow action interface 204. In one embodiment, this results in a call to a hosting server 104 in the open domain. In particular, a call is made to the open domain workflow action manager 172, which supplies a catalog 206. The catalog is a list of available open domain workflow actions. The catalog is received at the enterprise domain 208. A user may then select an open domain workflow action. This results in a call to the open domain workflow manager 210, which receives the selection. The open domain workflow manager may supply configuration parameters associated with the open domain workflow action 212. The configuration parameters specify the types of information available and various formats for the information. Ideally, the configuration parameters are presented in a similar manner for all open domain workflow actions. Such an approach makes configuration setting simpler for a technically unsophisticated user. In the enterprise domain, configuration parameters are specified 214. The configuration parameters are then sent to and are received by the open domain workflow action manager 216.

Selection of enterprise workflow actions and open domain workflow actions results in a defined workflow 218. The defined workflow 218 may be subsequently executed 220. When an open domain workflow action is encountered in the defined workflow, a call is made to the open domain workflow action manager, which provides a service interface 222. The service interface 222 calls a web service, which supplies data 224. The service interface 222 formats the information for utilization in the defined workflow. The formatted information is then passed back to the defined workflow that is being executed.

Figure 3:
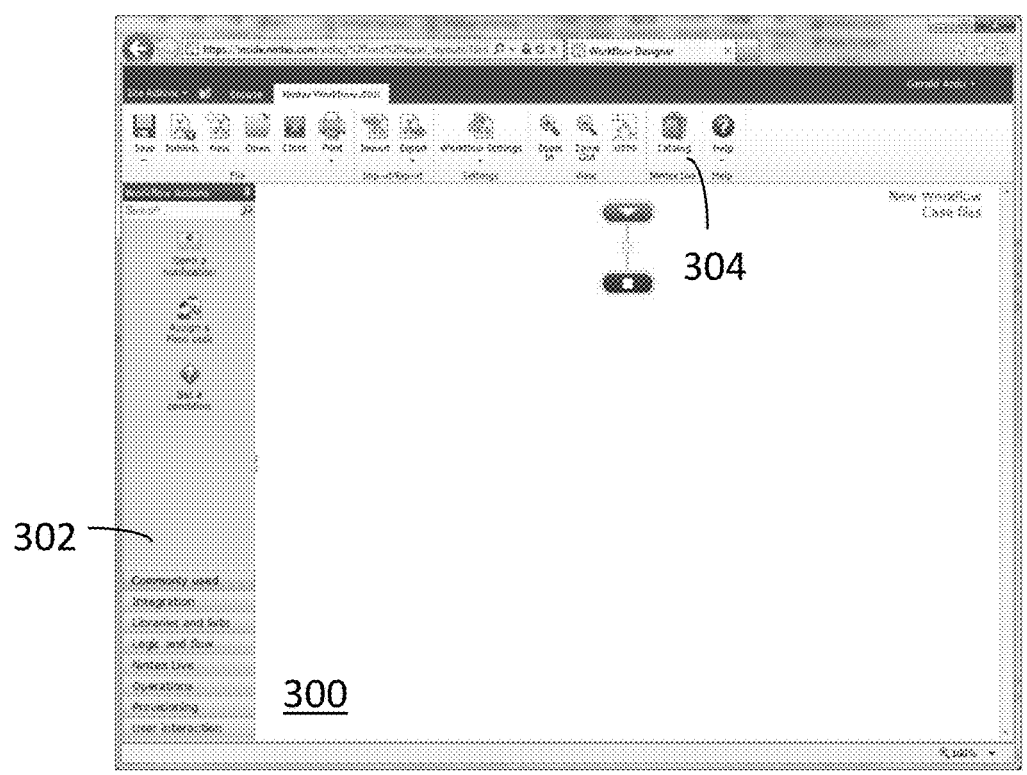
FIG. 3 illustrates a workflow canvas that may be utilized in accordance with an embodiment of the invention.

The operations of the invention are more fully appreciated with a specific example. FIG. 3 illustrates a canvas 300 that may be used to construct a workflow. The canvas may be part of a workflow designer 122 operating on an enterprise computer 102. Enterprise workflow actions may be selected from one or more menus or lists in an enterprise workflow actions block 302. Open domain workflow actions may be accessed by clicking on a catalog button 304. This produces a call to the open domain workflow action manager 172 of server 104, which supplies the catalog.

Figure 4:
FIG. 4 illustrates a catalog of open domain workflow actions that may be supplied in accordance with an embodiment of the invention.

FIG. 4 illustrates a catalog 400 of open domain workflow actions. The catalog 400 may include additional information 402, such as service provider details, a service description, service information and legal notices. The catalog 400 allows a user to easily identify open domain workflow actions. In this example, the user selects the Google® open domain workflow action 404.

Figure 5:
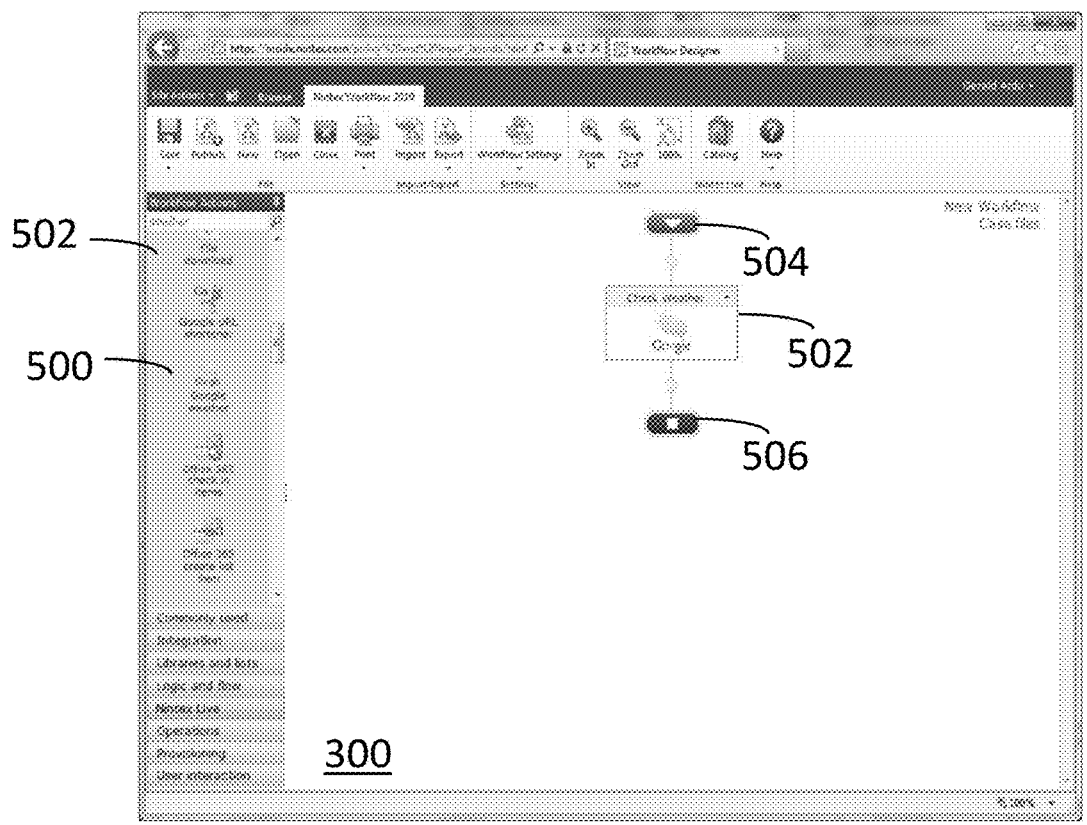
FIG. 5 illustrates a selected open domain workflow action on the canvas.

The open domain workflow action appears as an action 500 in the workflow actions block 502 of FIG. 5. A user may drag and drop the action onto the canvas 300. This results in a workflow action block 502 between a start block 504 and an end block 506. Clicking on the workflow action block 502 may invoke a configuration parameter menu. Alternately, the configuration parameter menu may be automatically presented upon receipt of an action selection.

Figure 6:
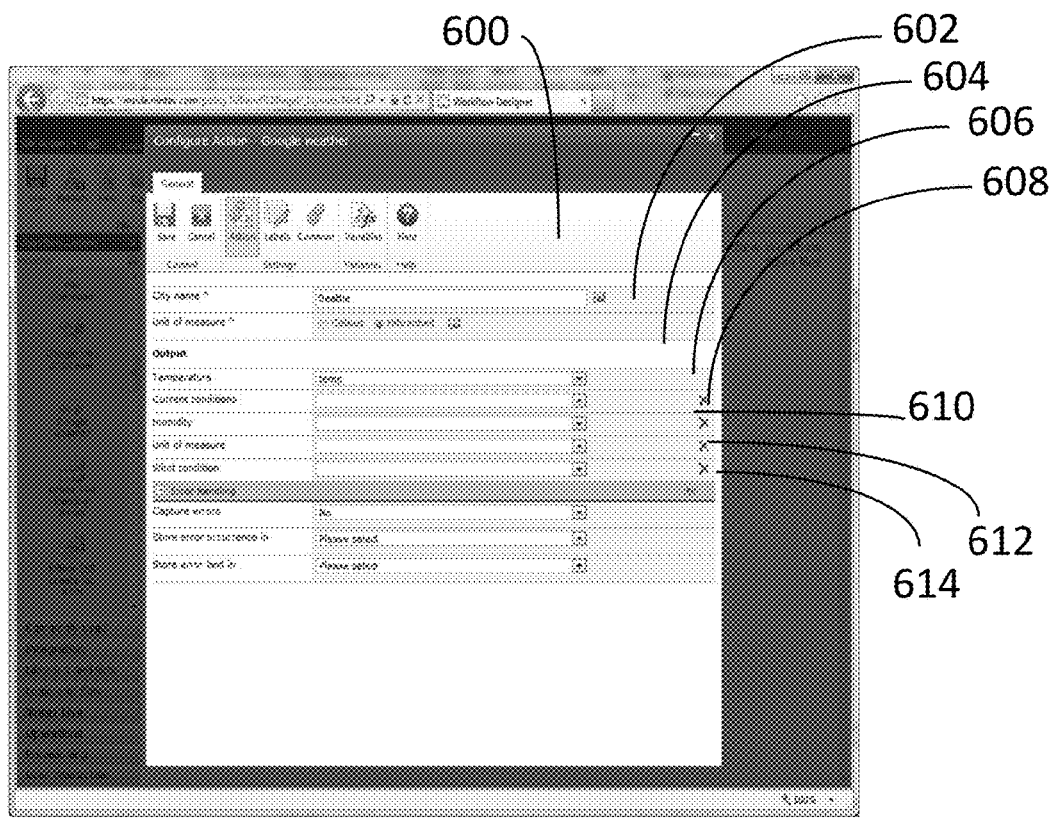
FIG. 6 illustrates open domain workflow action parameters that may be set in accordance with an embodiment of the invention.

FIG. 6 illustrates an example of a configuration menu 600. In this example, the configuration menu allows one to specify a city name input 602 and a unit of measure input 604. Various output parameters are available for selection. For example, the output parameters may be selected from temperature 606, current conditions 608, humidity 610, unit of measure 612 and wind condition 614. Observe here that these outputs correspond to some, but not all, of the outputs provided by the example web service call above. For example, the forecast date, forecast time and weather conditions for additional days of the week were available in the results shown above, but this workflow action is configured to provide only some of the available outputs. Thus, the open domain workflow action may be configured to provide all web service outputs or a subset thereof. The configuration parameters may be default parameters.

The configuration menu allows a non-technical user to set parameters for a web service. The open domain workflow action manager provides a simplified interface to the web service and brokers communications with the web service, thereby isolating the non-technical user from the complications associated with a web service. Consequently, a generic web service may be utilized in an enterprise domain workflow.

Once the parameters are set, either by default or customization, an open domain workflow action is established. The open domain workflow action may then be used in a defined workflow.

The follow code is an example of an open domain workflow action constructed by the open domain workflow action manager for the Google® weather web service. This code allows the open domain workflow action to interface with enterprise workflow actions in a defined workflow. The code calls the open domain workflow action manager and provides specified parameters. The open domain workflow action manager contacts the specified web service to retrieve results and then formats those results for the defined workflow. The code below is annotated with asterisks (\*\*\*) and numerals that correspond to the parameters specified in FIG. 6.

```
<ConfigResponse xmlns="http://contracts.nintex.com/live/2011/09/30">
    <ServiceConfigs xmlns:i="http://www.w3.org/2001/XMLSchema-instance">
        <ServiceConfig>
            <TimeStamp xmlns="http://schemas.datacontract.org/2004/07/Core.Contracts.BusinessModels.Persistent">0001-01-01T00:00:00</TimeStamp>
            <ProviderId>763f09e7-8d18-4bc1-a49c-d2f547c4b2d4</ProviderId>
            <ServiceId>8f08e3ec-8fd8-44bf-aab1-83e7936ab3a1</ServiceId>
            <ServiceVersionId>20110513130000</ServiceVersionId>
            <IconUrl>https://nintexlive.blob.core.windows.net/serviceicon/image_a01a520a-4379-4659-98ea-8b443d1ff7f3.png</IconUrl>
            <IconToolboxUrl>https://nintexlive.blob.core.windows.net/serviceicon/image_cc05409d-0995-422a-8db8-ad0eba15b74d.png</IconToolboxUrl>
            <ServiceName>Google weather</ServiceName>
            <Description>Get the current weather details for a specified location.</Description>
            <DefaultLcid>1033</DefaultLcid>
            <Parameters>
              <ConfigParameter>
                <InternalName>InputCityName</InternalName> *602*
                <Name>City name</Name>
                <Description/>
                <ValueType>
                   <IsDefault>false</IsDefault>
                   <Name>String</Name>
                   <Value>6</Value>
                </ValueType>
                <ParameterType>
                   <IsDefault>true</IsDefault>
```

```
            <Name>UserProvided</Name>
            <Value>0</Value>
          </ParameterType>
          <LookupValueCollection xmlns:a="http://schemas.microsoft.com/2003/10/Serialization/Arrays"/>
          <PropertyBag xmlns:a="http://schemas.microsoft.com/2003/10/Serialization/Arrays"/>
          <Direction>
            <IsDefault>false</IsDefault>
            <Name>Input</Name>
            <Value>1</Value>
          </Direction>
          <Required>true</Required>
        </ConfigParameter>
        <ConfigParameter>
          <InternalName>InputUnit</InternalName>
          <Name>Unit of measure</Name>
          <Description/>
          <ValueType>
            <IsDefault>false</IsDefault>
            <Name>String</Name>
            <Value>6</Value>
          </ValueType>
          <ParameterType>
            <IsDefault>false</IsDefault>
            <Name>LookupList</Name>
            <Value>1</Value>
          </ParameterType>
          <LookupValueCollection xmlns:a="http://schemas.microsoft.com/2003/10/Serialization/Arrays">
            <a:KeyValueOfstringanyType>
              <a:Key>Celsius</a:Key>
              <a:Value i:type="b:string" xmlns:b="http://www.w3.org/2001/XMLSchema">c</a:Value>
            </a:KeyValueOfstringanyType>
            <a:KeyValueOfstringanyType>
              <a:Key>Farenheitqa:Key> *604*
              <a:Value i:type="b:string" xmlns:b="http://www.w3.org/2001/XMLSchema">f</a:Value>
            </a:KeyValueOfstringanyType>
          </LookupValueCollection>
          <PropertyBag xmlns:a="http://schemas.microsoft.com/2003/10/Serialization/Arrays"/>
          <Direction>
            <IsDefault>false</IsDefault>
            <Name>Input</Name>
            <Value>1</Value>
          </Direction>
          <Required>true</Required>
        </ConfigParameter>
        <ConfigParameter>
          <InternalName>OutputTemperature</InternalName>
          <Name>Temperature</Name> *606*
          <Description/>
          <ValueType>
            <IsDefault>false</IsDefault>
            <Name>Double</Name>
            <Value>3</Value>
          </ValueType>
          <ParameterType>
            <IsDefault>true</IsDefault>
            <Name>UserProvided</Name>
            <Value>0</Value>
          </ParameterType>
          <LookupValueCollection xmlns:a="http://schemas.microsoft.com/2003/10/Serialization/Arrays"/>
          <PropertyBag xmlns:a="http://schemas.microsoft.com/2003/10/Serialization/Arrays">
            <a:KeyValue0fComplexPropertiesanyTypeLODWZCN7>
              <a:Key>
                <IsDefault>false</IsDefault>
                <Name>VisibleByDefault</Name>
                <Value>5</Value>
              </a:Key>
              <a:Value i:type="b:string" xmlns:b="http://www.w3.org/2001/XMLSchema">True</a:Value>
            </a:KeyValue0fComplexPropertiesanyTypeLODWZCN7>
          </PropertyBag>
          <Direction>
```

-continued

```
            <IsDefault>false</IsDefault>
            <Name>Output</Name>
            <Value>2</Value>
          </Direction>
          <Required>false</Required>
        </ConfigParameter>
        <ConfigParameter>
          <InternalName>OutputCondition</InternalName>
          <Name>Current conditions</Name> *608*
          <Description/>
          <ValueType>
            <IsDefault>false</IsDefault>
            <Name>String</Name>
            <Value>6</Value>
          </ValueType>
          <ParameterType>
            <IsDefault>true</IsDefault>
            <Name>UserProvided</Name>
            <Value>0</Value>
          </ParameterType>
          <LookupValueCollection xmlns:a="http://schemas.microsoft.com/2003/10/Serialization/Arrays"/>
          <PropertyBag xmlns:a="http://schemas.microsoft.com/2003/10/Serialization/Arrays"/>
          <Direction>
            <IsDefault>false</IsDefault>
            <Name>Output</Name>
            <Value>2</Value>
          </Direction>
          <Required>false</Required>
        </ConfigParameter>
        <ConfigParameter>
          <InternalName>OutputHumidity</InternalName>
          <Name>Humidity</Name> *610*
          <Description/>
          <ValueType>
            <IsDefault>false</IsDefault>
            <Name>String</Name>
            <Value>6</Value>
          </ValueType>
          <ParameterType>
            <IsDefault>true</IsDefault>
            <Name>UserProvided</Name>
            <Value>0</Value>
          </ParameterType>
          <LookupValueCollection xmlns:a="http://schemas.microsoft.com/2003/10/Serialization/Arrays"/>
          <PropertyBag xmlns:a="http://schemas.microsoft.com/2003/10/Serialization/Arrays"/>
          <Direction>
            <IsDefault>false</IsDefault>
            <Name>Output</Name>
            <Value>2</Value>
          </Direction>
          <Required>false</Required>
        </ConfigParameter>
        <ConfigParameter>
          <InternalName>OutputUnit</InternalName>
          <Name>Unit of measure</Name> *612*
          <Description/>
          <ValueType>
            <IsDefault>false</IsDefault>
            <Name>String</Name>
            <Value>6</Value>
          </ValueType>
          <ParameterType>
            <IsDefault>true</IsDefault>
            <Name>UserProvided</Name>
            <Value>0</Value>
          </ParameterType>
          <LookupValueCollection xmlns:a="http://schemas.microsoft.com/2003/10/Serialization/Arrays"/>
          <PropertyBag xmlns:a="http://schemas.microsoft.com/2003/10/Serialization/Arrays"/>
          <Direction>
            <IsDefault>false</IsDefault>
            <Name>Output</Name>
            <Value>2</Value>
          </Direction>
```

-continued

```
        <Required>false</Required>
      </ConfigParameter>
      <ConfigParameter>
        <InternalName>OutputWindCondition</InternalName>
        <Name>Wind condition</Name> *614*
        <Description/>
        <ValueType>
          <IsDefault>false</IsDefault>
          <Name>String</Name>
          <Value>6</Value>
        </ValueType>
        <ParameterType>
          <IsDefault>true</IsDefault>
          <Name>UserProvided</Name>
          <Value>0</Value>
        </ParameterType>
        <LookupValueCollection xmlns:a="http://schemas.microsoft.com/2003/10/Ser
ialization/Arrays"/>
        <PropertyBag xmlns:a="http://schemas.microsoft.com/2003/10/Serialization
/Arrays"/>
        <Direction>
          <IsDefault>false</IsDefault>
          <Name>Output</Name>
          <Value>2</Value>
        </Direction>
        <Required>false</Required>
      </ConfigParameter>
    </Parameters>
  </ServiceConfig>
 </ServiceConfigs>
</ConfigResponse>
```

The open domain workflow action manager 172 may include additional code for message queue management. For example, the code may place a message (e.g., a web service request) in a queue if the message cannot be immediately serviced. In addition, the queue may be used in the event that a selected request fails because a web service is offline, in which case the message may be queued and the request to the offline web service may be attempted at a later time. The open domain workflow action manager may also include code to perform authentication operations.

Figure 7:
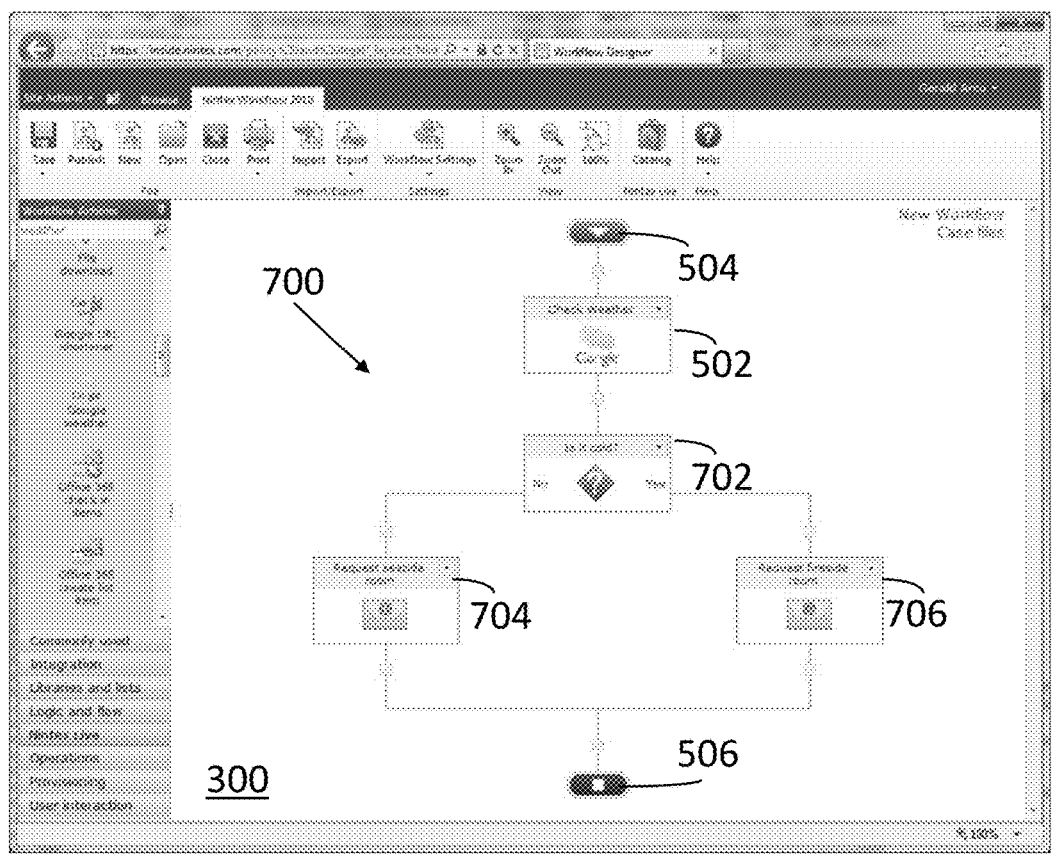
FIG. 7 illustrates a canvas with a defined workflow comprising enterprise workflow actions and open domain workflow actions.

FIG. 7 illustrates a defined workflow 700. The defined workflow has the same components as in FIG. 5, but includes additional enterprise workflow actions 702, 704 and 706. Enterprise workflow action 702 compares a received temperature from open domain workflow action 502 to a specified threshold. If the temperature is not cold, then an enterprise workflow action 704 is invoked. The workflow action 704 requests a seaside room, for example through an enterprise application that utilizes a pre-arranged rate at a designated hotel. If the temperature is cold, then an enterprise workflow action 706 is invoked to perform an alternate action.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs, and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming languages and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method, comprising:
providing, by a computing device, a catalog of selectable web services in an enterprise workflow application;
constructing, by the computing device, an enterprise workflow in the enterprise workflow application, wherein the enterprise workflow comprises a selected web service from the catalog and an enterprise workflow action, the enterprise workflow being configured to operate in a closed domain and the selected web service being located in an open domain; and executing, by the computing device, the enterprise workflow action in the enterprise workflow using an output of the selected web service by
transmitting, by the computing device via a communicatively coupled interface, a call from the enterprise workflow action operating in the closed domain across a network to the selected web service located in the open domain,
receiving, in the interface, the output from the selected web service,
formatting, in the interface, the output to enable the output to be executed in the closed domain by the enterprise workflow action, and
transmitting the formatted output from the interface to the computing device.

2. The method of claim 1, further comprising providing, by the computing device, a configuration menu in the enterprise workflow application to enable configuration of the output of the selected web service.

3. The method of claim 2, wherein the configuration of the output of the selected web service includes at least one of (i) a selection of a type of information available from the selected web service, and (ii) a selection of a format of the information available from the selected web service.

4. The method of claim 2, further comprising transmitting, from the computing device to the interface, the configuration of the output of the selected web service,
wherein formatting the output includes at least one of (i) filtering the output based on the configuration, and (ii) converting the output based on the configuration into a format that is compatible with at least one of the enterprise workflow action, the enterprise workflow, and the closed domain.

5. The method of claim 1, further comprising enabling, by the computing device, the selected web service to be dragged and dropped from the catalog onto the enterprise workflow in the enterprise workflow application.

6. A non-transitory computer-readable medium having instructions stored thereon, which, when executed by a processor, cause the processor to perform operations comprising:
providing a catalog of selectable web services in an enterprise workflow application;
constructing an enterprise workflow in the enterprise workflow application, wherein the enterprise workflow comprises a selected web service from the catalog and an enterprise workflow action, the enterprise workflow being configured to operate in a closed domain and the selected web service being located in an open domain; and
executing the enterprise workflow action in the enterprise workflow using an output of the selected web service by
transmitting a call from the enterprise workflow action operating in the closed domain across a network to the selected web service located in the open domain,
receiving the output from the selected web service, and
formatting the output to enable the output to be executed in the closed domain by the enterprise workflow action.

7. The non-transitory computer-readable medium of claim 6, further comprising instructions to provide a configuration menu in the enterprise workflow application to enable configuration of the output of the selected web service.

8. The non-transitory computer-readable medium of claim 7, wherein the configuration of the output of the selected web service includes at least one of (i) a selection of a type of information available from the selected web service, and (ii) a selection of a format of the information available from the selected web service.

9. The non-transitory computer-readable medium of claim 7, further comprising instructions to format the output by at least one of (i) filtering the output based on the configuration, and (ii) converting the output based on the configuration into a format that is compatible with at least one of the enterprise workflow action, the enterprise workflow, and the closed domain.

10. The non-transitory computer-readable medium of claim 6, further comprising instructions to enable the selected web service to be dragged and dropped from the catalog onto the enterprise workflow in the enterprise workflow application.

11. An apparatus, comprising:
a computing device within a closed domain configured to:
provide a catalog of selectable web services in an enterprise workflow application,
construct an enterprise workflow in the enterprise workflow application, wherein the enterprise workflow comprises a selected web service from the catalog and an enterprise workflow action, and
execute the enterprise workflow action in the enterprise workflow using an output of the selected web service; and
an interface within the closed domain and communicatively coupled to the computing device, the interface configured to:
transmit a call from the enterprise workflow action across a network to the selected web service located in an open domain,
receive the output from the selected web service,
format the output to enable the output to be executed by the enterprise workflow action, and
transmit the formatted output from the interface to the computing device.

12. The apparatus of claim 11, wherein the computing device and the interface are separated from the open domain by a firewall.

13. The apparatus of claim 11, wherein the computing device is configured to provide a configuration menu in the enterprise workflow application to enable configuration of the output of the selected web service.

14. The apparatus of claim 13, wherein the configuration of the output of the selected web service includes at least one of (i) a selection of a type of information available from the selected web service, and (ii) a selection of a format of the information available from the selected web service.

15. The apparatus of claim 13,
wherein the computing device is configured to transmit, to the interface, the configuration of the output of the selected web service, and
wherein the interface is configured to format the output by at least one of (i) filtering the output based on the configuration, and (ii) converting the output based on the configuration into a format that is compatible with at least one of the enterprise workflow action, the enterprise workflow, and the closed domain.

* * * * *